Sept. 23, 1969   R. A. BELLEMARE   3,469,142

INTENSITY CONTROL CIRCUIT FOR OSCILLOSCOPE OR THE LIKE

Filed June 20, 1967

INVENTOR
RICHARD A. BELLEMARE

BY James and Franklin
ATTORNEYS

United States Patent Office 3,469,142
Patented Sept. 23, 1969

3,469,142
INTENSITY CONTROL CIRCUIT FOR OSCILLOSCOPE OR THE LIKE
Richard A. Bellemare, Oakville, Conn., assignor, by mesne assignments, to Spedcor Electronics, Inc.
Filed June 20, 1967, Ser. No. 647,478
Int. Cl. H01j 29/52
U.S. Cl. 315—30                4 Claims

ABSTRACT OF THE DISCLOSURE

An electronic valve such as a transistor has its electrodes connected between the control grid of an oscilloscope and the source of biasing voltage for the control grid, thereby constituting an exceedingly high impedance which prevents loss of signal intensity when signals are applied to the control grid from an external circuit.

---

Figure 1:
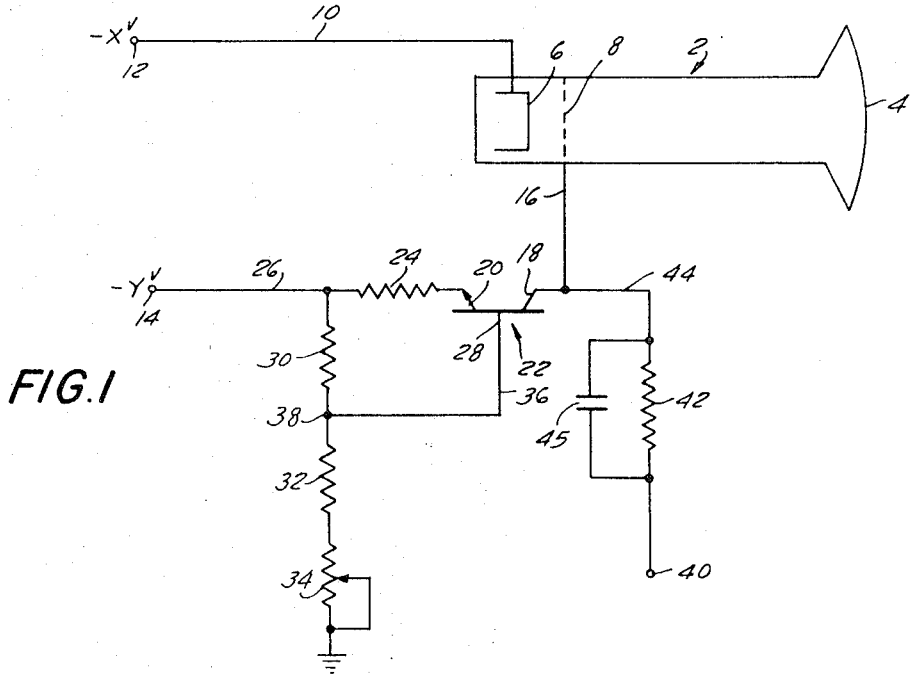

The present invention relates to a circuit for controlling the intensity of the visible output of an oscilloscope or the like, and in particular to such a circuit so designed as to effectively prevent any loss of input signal therethrough.

In oscilloscopes or the like there is a cathode which constitutes the source of an electron beam and there is a control grid which, in accordance with the energization thereof, controls the intensity of the beam which reaches the fluorescent screen, and thus controls the intensity of the picture, trace or other visible indication produced on the screen. The cathode and the grid must be biased, and often to different voltages. For example, in a typical unit if the cathode is biased to −1000 volts the bias applied to the grid will be varied between −1000 volts and −1100 volts, the latter value representing a blocking of the electron beam, corresponding to an off condition of the oscilloscope, while the former corresponds to a beam of maximum operative intensity, corresponding to a fully on condition of the oscilloscope. In addition to this bias which is applied to the control grid, an input signal is also applied thereto, the latter controlling the visible output of the tube in accordance with a desired input parameter which may correspond to a measured electrical value in some electrical circuit. It is desirable that the input signal be transmitted to the grid, thereby to control the visible output of the oscilloscope, without any loss, since whatever loss in signal input may occur will be translated into a loss of accuracy in correspondence between the input signal and the visible output from the oscilloscope.

The control of the bias, in order to vary the intensity of the visible output from zero or "off" to maximum "on," must be accomplished independently of such control of the intensity as is produced by the operative input signal. Thus some means must be provided for isolating the biasing circuit from the signal input circuit to as great a degree as is feasible. In the past this isolation has been achieved only to a comparatively limited degree, with consequent loss in efficiency of signal translation.

It is the prime object of the present invention to devise an intensity control circuit for an oscilloscope in which the signal input is isolated from the manual intensity control for normal biasing of the control grid to a markedly greater degree than has heretofore been thought possible, and to accomplish this in a simple manner, through the use of known and reliable circuit elements, without adding appreciably, if at all, to the cost of the unit concerned.

A further problem involved in the design of an oscilloscope intensity circuit has to do with the voltage level at which the manual intensity control functions. Conventionally manual circuit control is operated at a fairly high value of potential, and hence special precautions must be taken to insulate the manually actuated control element, lest the operator of the device be subjected to electric shock from such high potential.

In accordance with the present invention, the means used for manually varying the intensity of the oscilloscope is located substantially at ground or reference potential, so that no precautions need be taken to protect the user of the device. Despite this location of the intensity-controlling instrumentality, it functions effectively and in a straightforward manner, thus adding no complexity whatsoever to, but instead simplifying, the overall circuitry.

Figure 2:
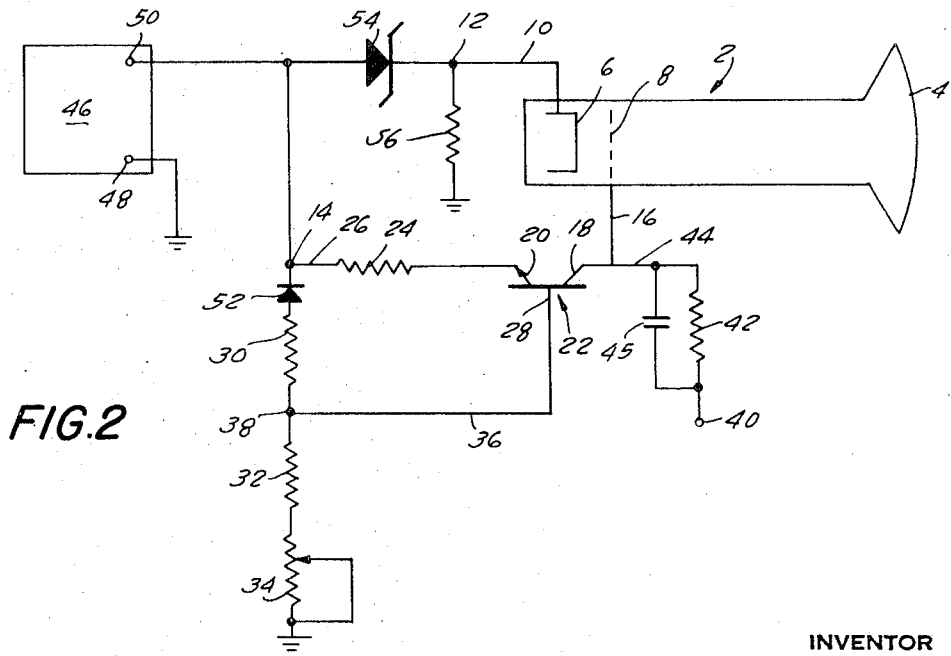

To the accomplishment of the above, and to such other objects as may hereinafter appear, the present invention relates to the design of a circuit for controlling intensity of the output of an oscilloscope or the like, as defined in the appended claims and as described in this specification, taken together with the accompanying drawings, in which:

FIGS. 1 and 2 are circuit diagrams of variants of the oscilloscope intensity circuits of the present invention.

Having reference first to FIG. 1, there is there disclosed in schematic fashion an oscilloscope generally designated 2 having a screen face 4 where the visible pattern is designed to appear, and having, internally thereof, a cathode 6 and a control grid 8. There are also, of course, various other grids and control plates, all as are conventional and well known, but since these form no part of and play no particular part in the present invention, they have been omitted for purposes of clarity.

The cathode 6 is connected by lead 10 to a source 12 of appropriate cathode biasing voltage. Conventionally the cathode 6 is biased to a negative voltage which will vary depending upon the particular oscilloscope 2 involved. In one known type of oscilloscope, the cathode 6 is adapted to be biased to a −850 volt potential.

The terminal 14 is adapted to be connected to an external source of voltage for biasing the control grid 8, the grid biasing voltage at its source being the same as or different from the cathode biasing voltage. The grid 8 is connected to the terminal 14 by lead 16 and by the output electrodes 18 and 20 of an electronic valve generally designated 22, and here shown in the form of a transistor, the output electrode 20 of that valve 22 being connected to terminal 14 by a resistor 24 and lead 26. The valve 22 is provided with a control electrode 28. A resistance network defining a voltage divider is connected between lead 26 and ground or any other source of reference potential, that network comprising resistors 30, 32 and 34, the latter being located adjacent to ground potential and being adjustable. The control electrode 28 of the valve 22 is connected by lead 36 to a point 38 between the resistors 30 and 32.

The terminal 40 is adapted to be connected to any suitable source of signal input, and it is connected to the control grid 8 of the oscilloscope 2 by a resistor 42, lead 44 and lead 16. If desired, a capacitor 45 may be connected in parallel with the resistor 42 in order to shorten the response time of the signal input circuit.

The characteristic of the electronic valve 22 which is of significance in connection with the present invention is that its internal impedance to ground looking into the output electrode 18 is very high when the control electrode 28 is properly biased relative to the output electrode 20. This bias is produced by the voltage divider network.

The voltage supply to the grid biasing terminal 14 will in general be more negative than that applied to the cathode 6, and this voltage, as modified by the setting of the resistor 34, will be transmitted to the control grid 8 via the output circuit of the transistor 22. When a resistor 34 is adjusted to have a low value of resistance the voltage transmitted to the control grid will be more negative than when the resistor 34 is adjusted to have a high value; hence when resistor 34 has a low value of resistance the oscilloscope tube will be off, and when the resistor 34 has a high value of resistance the tube will be on. At all times the bias on the control electrode 28 will be such as to cause the transistor 22 to have a high impedance looking into the output electrode 18, as mentioned above.

Adjustment of the resistor 34, in a typical physical embodiment of the oscilloscope, will be accomplished by manipulating a knob provided on the control panel of the oscilloscope. The fact that the resistor 34 is at ground potential is an important feature of the instant circuitry, since the ground potential applied thereto makes it unnecessary to provide any special protection between the adjusting knob and the resistor itself. This not only minimizes the cost of the unit but also provides positive insurance against injury to the user of the device.

The input signals applied to the terminal 40 are transmitted to the grid 8 by a resistor 42 and leads 44 and 16. The only connection between this signal input circuit and ground or the cathode 6 is via the transistor 22. Since the internal impedance of the transistor 22 looking into the electrode 18 is exceedingly high, inherently as a result of the design and biasing of the transistor 22, that high impedance will effectively block the input signal, thus preventing all but an infinitesimal portion of that input signal from going any place except to the control grid 8. In other words, because the collector impedance of the transistor 22 is so high, there is practically no signal loss in the signal input circuit. Hence the sensitivity of the oscilloscope 2, that is to say, the degree to which the intensity of the visual output therefrom is responsive to the signal input thereto, is greatly maximized.

The circuit of FIG. 1 is general in nature, since it discloses two different input terminals 12 and 14 for the cathode bias and control grid bias respectively. The same external voltage source can be used to provide both of these biasing voltages, and this is disclosed in FIG. 2. There a voltage scource 46 has one terminal 48 connected to ground, its other terminal 50 being at a predetermined negative potential. The voltage divider circuit 30, 32, 34 is connected between the negative voltage terminal 50 and ground in series with temperature-compensating rectifier 52 (which could be employed in the circuit of FIG. 1 if desired). The resistor 24 is connected to the output electrode 20 of the transistor 22 and its left-hand end is connected to the voltage divider at the point 14 (corresponding to the point 14 in FIG. 1) located above the rectifier 52. The cathode 6 and lead 10 are connected to point 12 in FIG. 2 (corresponding to point 12 in FIG. 1), point 12 in FIG. 2 being connected to the negative voltage terminal 50 via Zener diode 54 and being connected to ground by a resistor 56. The function of the Zener diode 54 is to ensure that the grid 8 will be at a lower potential than the cathode 6. For example, if the voltage at point 50 is at −850 volts, the diode 54 may be designed to provide a voltage drop of 75 volts, thus producing a biasing voltage at the cathode 6 of −775 volts.

Purely by way of example, and without in any way limiting the breadth of the inventiveness of the system here disclosed, the following circuit values may be employed in connection with a typical oscilloscope installation:

| | | |
|---|---|---|
| Resistor 24 | ohms | 20K |
| Resistor 30 | do | 82K |
| Resistor 32 | megohm | 3.6 |
| Resistor 34 | do | 1 |
| Resistor 42 | do | 1 |
| Capacitor 45 | microfarad | .001 |
| Resistor 56 | megohm | 1.5 |

Through the use of the circuitry here involved the intensity signal input is effectively isolated from the remainder of the circuit, the manual intensity and on-off control is affected in a simple and safe fashion, and the overall circuitry is uncomplicated, inexpensive and reliable.

While but a limited number of versions of the instant invention have been here disclosed, it will be apparent that many variations may be made therein, all within the scope of the following claims.

I claim:
1. In an oscilloscope having a cathode and a control grid, means to apply a bias to said cathode, means to apply an input signal to said control grid to control the visible presentation of said oscilloscope, and an intensity control circuit to vary the brightness of said visible presentation, said circuit comprising:
   (a) a grid bias voltage source,
   (b) a transistor having a base, an emiter and a collector,
   (c) means connecting said collector to the control grid of said oscilloscope,
   (d) means connecting said emiter to said grid bias voltage source whereby a bias voltage is applied in series with said emiter and collector to said control grid, and
   (e) adjustable voltage divider means coupled to said source to apply a bias to said base relative to said emiter in a voltage range maintaining the internal collector-to-base impedance of said transistor at a relatively high level, whereby adjustment of said voltage divider varies the bias applied to said control grid to vary the brightness of the visible presentation of the oscilloscope without substantially diminishing the input signal applied to said control grid.

2. In an oscilloscope as set forth in claim 1, wherein said grid bias source also serves to provide the bias voltage to said cathode.

3. In an oscilloscope as set forth in claim 2, further including a Zener diode interposed between said cathode and said grid bias source to maintain the control grid at a lower potentional than said cathode.

4. In an oscilloscope as set forth in claim 3, further including a temperature-compensating rectifier in series with said voltage divider means.

References Cited
UNITED STATES PATENTS

| | | | |
|---|---|---|---|
| 2,745,038 | 5/1956 | Sziklai | 315—30 |
| 2,782,340 | 2/1957 | Siskel | 315—30 |
| 2,843,796 | 7/1958 | Schade | 315—30 X |
| 2,975,327 | 3/1961 | Poorter | 315—30 |
| 3,005,929 | 10/1961 | Reichert | 315—30 |
| 3,134,046 | 5/1964 | Walton | 315—30 |
| 3,137,805 | 6/1964 | Shapiro | 315—30 |

RODNEY D. BENNETT, JR., Primary Examiner

D. C. KAUFMAN, Assistant Examiner